United States Patent
Ashwood-Smith et al.

(10) Patent No.: US 9,847,915 B2
(45) Date of Patent: Dec. 19, 2017

(54) NETWORK FUNCTION VIRTUALIZATION FOR A NETWORK DEVICE

(71) Applicant: Futurewei Technologies, Inc., Plano, TX (US)

(72) Inventors: Peter Ashwood-Smith, Gatineau (CA); Mehdi Arashmid Akhavain Mohammadi, Ottawa (CA); Evelyne Roch, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 14/152,909

(22) Filed: Jan. 10, 2014

(65) Prior Publication Data

US 2014/0201374 A1 Jul. 17, 2014

Related U.S. Application Data

(60) Provisional application No. 61/751,672, filed on Jan. 11, 2013, provisional application No. 61/826,284, filed on May 22, 2013.

(51) Int. Cl.
*G06F 15/173* (2006.01)
*H04L 12/24* (2006.01)
(Continued)

(52) U.S. Cl.
CPC ............... *H04L 41/18* (2013.01); *G06F 9/50* (2013.01); *H04L 49/70* (2013.01)

(58) Field of Classification Search
CPC ....... H04L 45/586; H04L 45/60; H04L 45/64; G06F 11/00; G06F 11/1658;
(Continued)

(56) References Cited

U.S. PATENT DOCUMENTS

2003/0051048 A1* 3/2003 Watson ................... H04L 45/00
  709/238
2008/0155208 A1* 6/2008 Hiltgen ............... G06F 9/45533
  711/154
(Continued)

FOREIGN PATENT DOCUMENTS

CN      102292698 A      12/2011
JP      20130232808 A    11/2013
(Continued)

OTHER PUBLICATIONS

Foreign Communication From A Counterpart Application, PCT Application No. PCT/US2014/011158, International Search Report dated May 9, 2014, 4 pages.
Foreign Communication From A Counterpart Application, PCT Application No. PCT/US2014/011158, Written Opinion dated May 9, 2014, 9 pages.
(Continued)

*Primary Examiner* — Dhairya A Patel
(74) *Attorney, Agent, or Firm* — Conley Rose, P.C.

(57) ABSTRACT

An apparatus for performing network function virtualization (NFV), comprising: a memory, a processor coupled to the memory, wherein the memory includes instructions that when executed by the processor cause the apparatus to perform the following: receive an instruction to virtualize a network device within a network, divide, according to the instruction, the network device into a plurality of network functions (NFs) used to form a virtualized network node that corresponds to the network device, launch the NFs within one or more virtual containers, and group the virtual containers together using a group identifier (ID) that corresponds to the virtualized network node, wherein each of the NFs correspond to a network function performed by the network device prior to virtualization.

20 Claims, 7 Drawing Sheets

(51) Int. Cl.
*G06F 9/50* (2006.01)
*H04L 12/931* (2013.01)

(58) Field of Classification Search
CPC ............... G06F 11/2005; G06F 11/201; G06F 11/2092; G06F 13/24; G06F 13/26; G06F 13/4022; G06F 3/06; G06F 3/0607; G06F 3/0611; G06F 3/0664; G06F 3/067
See application file for complete search history.

(56) References Cited

U.S. PATENT DOCUMENTS

| | | | | |
|---|---|---|---|---|
| 2009/0094399 | A1* | 4/2009 | Daniel | G06F 13/4022 710/311 |
| 2010/0198972 | A1* | 8/2010 | Umbehocker | G06F 3/0604 709/226 |
| 2010/0212013 | A1* | 8/2010 | Kim | H04L 45/00 726/23 |
| 2010/0278073 | A1* | 11/2010 | Bhavanam | H04L 12/4679 370/254 |
| 2011/0142053 | A1* | 6/2011 | Van Der Merwe | H04L 47/72 370/395.1 |
| 2012/0087252 | A1* | 4/2012 | Ansorge | H04J 3/0623 370/249 |
| 2014/0074899 | A1* | 3/2014 | Halevy | G06F 3/067 707/827 |
| 2014/0086253 | A1* | 3/2014 | Yong | H04L 12/4633 370/395.53 |
| 2014/0181267 | A1* | 6/2014 | Wadkins | H04L 69/163 709/219 |
| 2014/0229945 | A1* | 8/2014 | Barkai | H04L 49/70 718/1 |
| 2014/0297782 | A1 | 10/2014 | Umbehocker | |

FOREIGN PATENT DOCUMENTS

| | | |
|---|---|---|
| KR | 20110073258 A | 6/2011 |
| KR | 101172766 B1 | 8/2012 |

OTHER PUBLICATIONS

Briscoe, B., et al., "Network Functions Virtualisation," XP055114765, Mar. 1, 2012, 13 pages.
Chiosi, M., et al., "Network Functions Virtualisation—Introductory White Paper," Issue 1, XP055091626, Oct. 22-24, 2012, 16 pages.
"Network Functions Virtualisation; End-to-End Architecture," GS NFV-0010, European Telecommunications Standards Institute (ETSI), V0.1.4, Jul. 19, 2014, 24 pages.
"Network Functions Virtualisation; End-to-End Architecture," GS NFV-0010, European Telecommunications Standards Institute (ETSI), V0.1.6, Aug. 13, 2013, 23 pages.
"Network Functions Virtualisation (NFV); Use Cases", European Telecommunications Standards Institute, ETSI GS NFV 001-V1.1.1, Oct. 2013, 50 pages.
"Network Functions Virtualisation (NFV); Architectural Framework", European Telecommunications Standards Institute, ETSI GS NFV 002-V1.1.1, Oct. 2013, 21 pages.
"Network Functions Virtualisation—An Introduction, Benefits, Enablers, Challenges & Call for Action", Network Functions Virtualisation—Introductory White Paper, Issue 1, Oct. 2012, 16 pages.
Rosen, E., et al., "Multiprotocol Label Switching Architecture", RFC 3031, Jan. 2001, 62 pages.
Andersson, L., et al., "Provider Provisioned Virtual Private Network (VPN) Terminology", RFC 4026, Mar. 2005, 21 pages.
Rekhter, Y., et al., "A Border Gateway Protocol 4 (BGP-4)", RFC 4270, Jan. 2006, 105 pages.
Foreign Communication from a counterpart Application, Japanese Application No. 2015-552836, Japanese Notice of Allowance dated Jul. 12, 2016, 3 pages.
Foreign Communication From A Counterpart Application, Korean Application No. 10-2015-7021387, Korean Notice of Allowance dated Feb. 2, 2017, 3 pages.
Foreign Communication From A Counterpart Application, Chinese Application No. 201480004573.X, Chinese Office Action dated Oct. 18, 2017, 3 pages.
Foreign Communication From A Counterpart Application, Chinese Application No. 201480004573.X, Chinese Search Report dated Oct. 18, 2017, 2 pages.

* cited by examiner

NETWORK FUNCTION VIRTUALIZATION FOR A NETWORK DEVICE

CROSS-REFERENCE TO RELATED APPLICATION

The present application claims priority to U.S. Provisional Patent Application No. 61/751,672 filed Jan. 11, 2013 by Peter Ashwood-Smith and entitled "Network Function Virtualization Platform," and U.S. Provisional Patent Application No. 61/826,284 filed May 22, 2013 by Peter Ashwood-Smith, et al. and entitled "System and Method for Provider Edge Device Virtualization," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In today's service provider networks, network edge devices, such as provider edge (PE) nodes, are configured to offer virtual private network (VPN) services to one or more customers. For instance, a PE node can simultaneously offer VPN services at layer 3 (L3), such as Internet Protocol (IP) VPN and at layer 2 (L2), such as Virtual Private Wire Service (VPWS) and Virtual Private Local Area Network (LAN) Service (VPLS), to satisfy customer requirements. As the number of VPN sites continue to grow, service providers are constantly expanding their networks to accommodate the growing demand for network resources. To expand the networks, service providers have historically installed new data cards to existing PE nodes until the PE nodes utilize all of their expansion capacity. When the PE nodes no longer have the capacity to accommodate new data cards, new PE nodes may be installed within the service provider networks to compensate for additional resource requirements. However, adding and fully configuring new network devices (e.g. new PE nodes) to the network often involves substantial costs both in the form of capital expenditures (CAPEX) and operational expenditures (OPEX).

In an attempt to reduce CAPEX and OPEX, Network Function Virtualization (NFV), as described in the European Telecommunications Standards Institute (ETSI) group specification (GS) NFV 002 v1.1.1, entitled "Network Functions Virtualisation (NFV); Architectural Framework," published October 2013, which is incorporated herein as if reproduced in its entirety, consolidates many types of physical network devices onto one or more general purpose servers, switches, storage, and/or other general purpose network nodes. For example, NFV may implement network functions performed by a variety of physical network devices that include, but are not limited to switching elements (e.g. message routers and broadband network gateway), mobile network nodes (e.g. serving general packet radio service (GPRS) support node (SGSN)), traffic analysis (e.g. deep packet inspection (DPI) and quality of service (QoS) measurement), application level optimization (e.g. application accelerators and content distribution networks (CDNs)), and security functions (e.g. firewall). By consolidating the physical network devices, NFV provides greater flexibility for a network by implementing network functions that can be moved to and/or instantiated in various locations in the network without the installation and configuration of new physical network devices.

Unfortunately, current implementations of NFV address CAPEX reduction associated with network expansion, but do not fully address lowering the OPEX cost. One NFV virtualization technique, the appliance NFV method, treats a physical network device (e.g. PE node or Broadband Remote Access Server (BRAS)) as a single virtual appliance and embeds the entire physical network device into a virtual machine (VM) on a commodity server. For example, if the physical network device is a PE node, the appliance NFV method may implement the entire PE functionality as a single unit and embed all of the PE functionality within a single VM. Additionally, the PE data path can either be implemented on the same VM, or the PE data path can utilize the data path capabilities of commodity switches. As such, the appliance NFV method as described above primarily targets the CAPEX cost associated with expanding an existing PE node and/or adding a new PE node to the network. The appliance NFV method provides relatively low OPEX cost reduction because the newly added PE nodes may still need to be fully configured and installed within a service provider network.

SUMMARY

In one embodiment, the disclosure includes an apparatus for performing NFV, comprising: a memory, a processor coupled to the memory, wherein the memory includes instructions that when executed by the processor cause the apparatus to perform the following: receive an instruction to virtualize a network device within a network, divide, according to the instruction, the network device into a plurality of network function units (NFs) used to form a virtualized network node that corresponds to the network device, launch the NFs within one or more virtual containers, and group the virtual containers together using a group identifier (ID) that corresponds to the virtualized network node, wherein each of the NFs correspond to a network function performed by the network device prior to virtualization.

In another embodiment, the disclosure includes an apparatus for performing NFV, comprising: a memory, a processor coupled to the memory, wherein the memory includes instructions that when executed by the processor cause the apparatus to perform the following: create a plurality of NFs that correspond to a plurality of network functions performed by a non-virtualized network device within a network, load the NFs within one or more virtual containers, group the virtual containers together using a group ID that identifies the network functions performed by a non-virtualized network device, monitor resource utilization for each of the virtual containers, and adjust resource allocation according to the resource utilization of each of the virtual containers.

In yet another embodiment, the disclosure includes a method for performing NFV, comprising: receiving an instruction to virtualize a PE device participating within a network, splitting the PE device into a plurality of NFs, wherein each of the NFs are used to perform a PE network function, grouping the NFs based on the instruction into one or more NF groups, placing each of the NF groups into a virtual container, and forwarding a plurality of data packets using the virtual containers.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein are at least one method, apparatus, and system that virtualize at least a portion of a physical network device using NFV. The NFV virtualization may virtualize the physical network device by dividing a physical network device into a plurality of NFs. Each of the NFs is configured to perform a network function typically implemented by the physical network device. A virtual container may host one or more of the NFs to address network scalability, expansion, and migration issues associated with the physical network device. The NFV virtualization may group and place the NFs within a virtual container using any one of the following: an absolute decomposition method, a network function decomposition method, and/or a service decomposition method in order to implement network functions performed by the physical network device. By virtualizing a physical network device into one or more NFs, the NFs may be distributed and arranged amongst virtual containers and/or hardware resource nodes to minimize OPEX costs.

Figure 1:
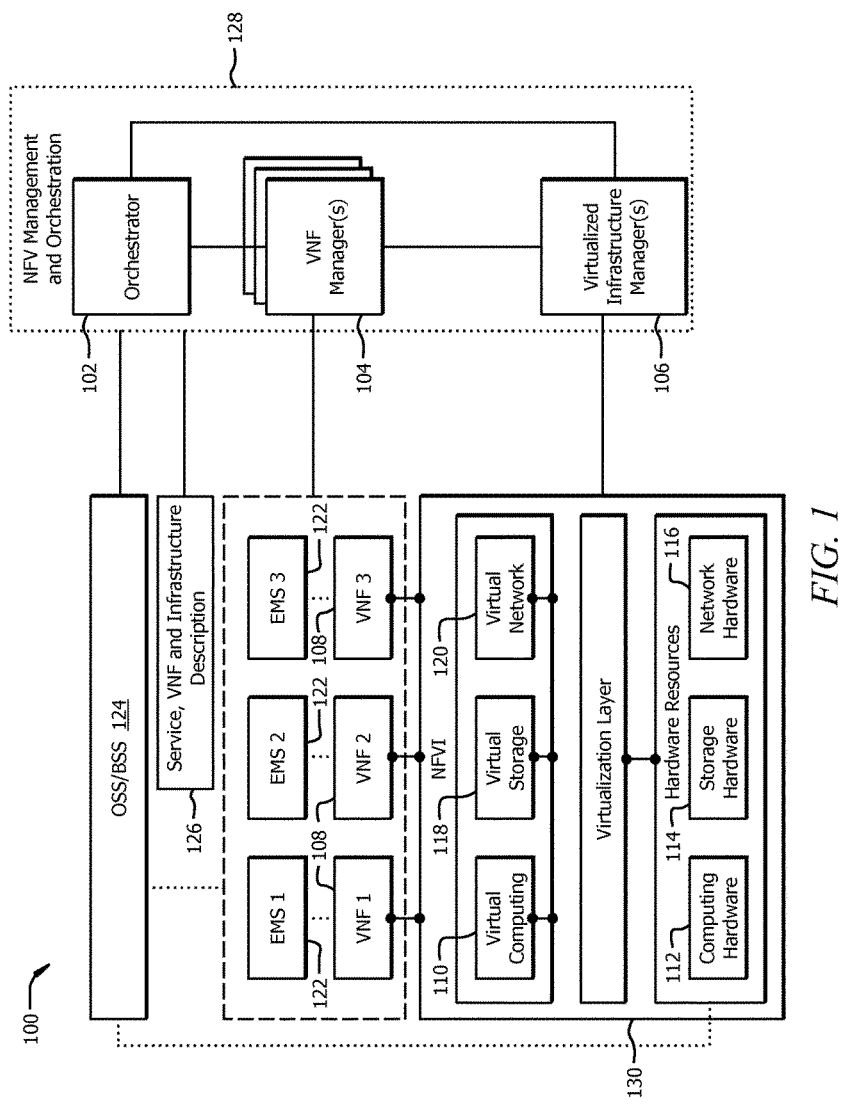
FIG. 1 is a schematic diagram of an embodiment of an NFV system where embodiments of the present disclosure may operate.

FIG. 1 is a schematic diagram of an embodiment of an NFV system 100 where embodiments of the present disclosure may operate. The NFV system 100 may be implemented using a variety of networks, such as a data center network, service provider network, and/or a LAN. The NFV system 100 may comprise an NFV Management and Orchestration system 128, an NFV Infrastructure (NFVI) 130, a plurality of virtual network functions (VNFs) 108, a plurality of element management systems (EMSs) 122, a Service, VNF, and Infrastructure Description system 126, and one or more Operations Support Systems (OSSs) and Business Support Systems (BSSs) (OSS/BSS) 124. The NFV Management and Orchestration system 128 may comprise an Orchestrator 102, one or more VNF managers 104, and one or more Virtualized Infrastructure Managers 106. The NFVI 130 may comprise computing hardware 112, storage hardware 114, and network hardware 116, a virtualization layer, a virtual computing 110, a virtual storage 118, and a virtual network 120. The Service, VNF, and Infrastructure Description Unit 126, and OSS/BSS 124 are discussed in more detail in the ETSI GS NFV 002 v1.1.1 standard.

The NFV Management and Orchestration system 128 may be configured to perform supervisory and management functions for VNFs 108 and NFVI 130. The Orchestrator 102 may be configured to the NFVI 130 and the virtualization resources within the NFVI 130. The Orchestrator 102 may also realize network services (e.g. L2 and L3 VPN services) on the NFVI 130. The Orchestrator 102 may communicate with one or more VNF managers 104 to implement resource related requests, send configuration information to the VNF managers 104, and collect state information of the VNFs 108. In addition, the Orchestrator 102 may communicate with the Virtualized Infrastructure Manager 106 to implement resource allocation and/or to reserve and exchange virtualized hardware resource configuration and state information. The VNF manager 104 may be configured to manage one or more VNFs 108. The VNF manager 104 may perform a variety of managing functions, such as instantiating, updating, querying, scaling, and/or terminating VNFs 108. The Virtualized Infrastructure Manager 106 may be configured to perform management functionalities that are used to control and manage the interaction of a VNF 108 with the computing hardware 112, storage hardware 114, network hardware 116, virtual computing 110 (e.g. VMs), virtual storage 118, and virtual network 120. For example, the Virtualized Infrastructure Manager 106 may perform resource management functions, such as managing infrastructure resource and allocation (e.g. increase resources to virtual containers) and operation functions such as collecting NFVI fault information. The VNF manager 104 and Virtualized Infrastructure Manager 106 may communicate with each other for resource allocation requests and to exchange virtualized hardware resource configuration and state information.

The NFVI 130 comprises hardware components, software components, or a combination of both to build up the virtualized environment to deploy, manage, and execute the VNFs 108. In other words, the hardware resources and virtualization layer are used to provide virtualized resources, such as VMs and other forms of virtual containers, for VNFs 108. The hardware resources comprise the computing hardware 112, storage hardware 114, and network hardware 116. The computing hardware 112 may be commercial off-the-shelf (COTS) hardware and/or custom hardware used to provide processing and computing resources. The storage hardware 114 may provide storage capacity that may be provided within the network or resides within the storage hardware 114 itself (e.g. local memory located within a server). In one embodiment, the resources from computing hardware 112 and storage hardware 114 may be pooled together. The network hardware 116 may be switches (e.g. commodity switches), routers, and/or any other network device configured to perform switching functions that are interconnected via wire and/or wireless links. The network hardware 116 may span across a plurality of domains and may comprise a plurality of networks that are interconnected via one or more transport networks.

The virtualization layer within the NFVI 130 may abstract the hardware resources and decouple the VNF 108 from the underlying physical network layer to provide virtualized resources to the VNF 108. As shown in FIG. 1, the virtualized resources may comprise a virtual computing 110, a virtual storage 118, and a virtual network 120. Virtual computing 110 and virtual storage 118 may be provided to the VNFs 108 in the form of hypervisors, VMs, and/or other virtual containers. For example, one or more of the VNFs 108 may be deployed on a VM. The virtualization layer abstracts the network hardware 116 to form the virtual network 120. The virtual network 120 may comprise virtual switches (Vswitches) that provide connectivity between the VMs and/or other virtual containers that host VNFs 108. The abstraction of hardware resources may be implemented using a variety of techniques that include, but are not limited to Virtual LAN (VLAN), VPLS, Virtual extensible LAN (VxLAN), and Network Virtualization using Generic Routing Encapsulation (NVGRE). Moreover, the transport network within network hardware 116 may be virtualized using a centralized control plane and a separate forwarding plane (e.g. Software Defined Network (SDN)).

As shown in FIG. 1, VNF Manager 104 may communicate with VNFs 108 and EMSs 122 to perform VNF lifecycle management and exchange configuration and state information. VNF 108 may be configured to be a virtualization of at least one of the network functions performed by a physical network device. In one embodiment, the VNF 108 may be a virtualized PE node configured to provide all PE network functions typically found within a non-virtualized PE device. In another embodiment, the VNF 108 may be configured to implement one of the components (e.g. operations, administration, and management (OAM) component) for the non-virtualized PE device. As such, a virtual container may host a single VNF 108 or may host a plurality of VNFs 108, where each VNF 108 runs in a virtual container and corresponds to a set of network functions belonging to one or more physical devices. Deploying VNFs 108 to perform network functions will be discussed in more detail in FIGS. 4-9. The EMS 122 may be configured to perform manage functionality for one or more VNFs 108.

Figure 2:
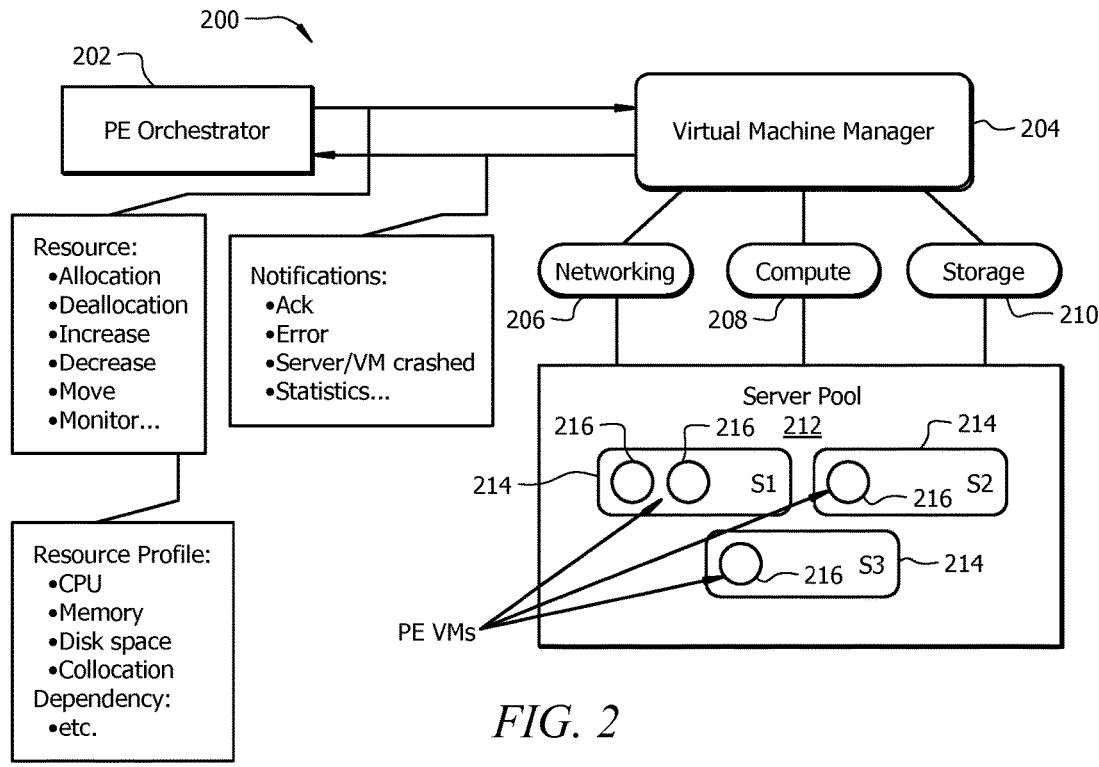
FIG. 2 is a schematic diagram of an embodiment of an NFV system used to virtualize a PE device.

FIG. 2 is a schematic diagram of an embodiment of an NFV system 200 used to virtualize a PE device. The NFV system 200 may comprise a PE Orchestrator 202, a Virtual Machine Manager 204, a networking system 206, a computing system 208, and a storage system 210. The Virtual Machine Manager 204 may be substantially similar to the Virtualized Infrastructure Manager 106 as described in FIG. 1. The networking system 206 may be substantially similar to virtual network 120 and network hardware 116 as described in FIG. 1. The computing system 208 may be substantially similar to virtual computing 110 and computing hardware 112 as described in FIG. 1. The storage system 210 may be substantially similar to virtual storage 118 and storage hardware 114 as described in FIG. 1. The networking system 206, computing system 208, and storage system 210 may be used to form one or more server pools 212 shared by the NFV system 200. The server pools 212 may comprise servers S1-S3 214 and/or any other network device used to house PE VMs 216. The PE VMs 216 may comprise one or more NFs, where each of the NFs is configured to implement a network function performed by a non-virtualized PE device.

The PE Orchestrator 202 may be substantially similar to the VNF Manager 104 described in FIG. 1, and may be hosted on a VM and/or other virtual container. In addition to functions performed by a VNF Manager 104, the PE Orchestrator 202 may specifically coordinate and launch PE VMs 216. The PE Orchestrator 202 may provide PE VMs 216 information used to communicate with each other. For example, each virtualized PE node may be assigned a unique device ID and/or other grouping ID. In instances where the virtualized PE node is garmented into multiple NFs (e.g. multiple network functions) and each of the NFs are loaded onto a PE VM 216, the PE Orchestrator 202 may group together PE VMs 216 that have the same device ID. The PE VMs 216 that are grouped together may perform at least some of the network functions performed by a non-virtualized PE device. The PE Orchestrator 202 and/or the Virtual Machine Manager 204 may map the device ID to a virtualized network identifier provided by the underlying network (e.g. VLAN tag or Tunnel ID) to isolate the communications between the PE VMs 216 grouped together. The PE Orchestrator 202 may communicate with the Virtual Machine Manager 204 to handle various notification events and to manage overall resource management, such as reservation, allocation, modification, and movement, when launching and managing the PE VMs 216.

To improve OPEX, the PE Orchestrator 202 may monitor resource utilization and trigger resource allocations for the PE VMs 216. The PE Orchestrator 202 may monitor in real-time the resource usage (e.g. central processing unit (CPU), memory, and memory usage) and trigger dynamic re-allocation and modification of resources initially allocated to the PE VMs 216 used to represent the network device. The re-allocation and modification of resources may be implemented in a proactive manner (e.g. no network notification) or a reactive manner (e.g. after network notification). For example, resources may re-allocated and modified in a proactive manner when a network administrator or operator observes an increase in the number of supported network devices and subsequently instructs the PE Orchestrator 202 to allocate more resources to one or more PE VMs 216. Conversely, the PE Orchestrator 202 may re-allocate and modify resources in a reactive manner when the PE Orchestrator 202 receives a notification from a PE VM 216, a Virtual Machine Manager 204 and/or other virtualized network nodes within the virtualized network.

PE Orchestrator 202 may also lower OPEX by performing PE VM 216 migration, depending on the network resource demand. In instances where the host server's 214 resources (e.g. CPU, memory, storage, etc.) are exhausted and may not support further resource demand for a PE VM 216, the PE Orchestrator 202 may trigger a move for the PE VM 216 to another server 214 with more capacity. Using FIG. 2 as an example, if server S2 214 no longer has enough resources to satisfy the PE VM 216, then the PE Orchestrator 202 may trigger a move for the PE VM 216 on server S2 214. The PE Orchestrator 202 may send a request to the Virtual Machine Manger 204 that moves the PE VM 216 on server S2 214 to another server 214. Once the Virtual Machine Manager 204 receives the request, the Virtual Machine Manager 204 may move the PE VM 216 on server S2 214 to another server 214 (e.g. server S3 214).

As persons of ordinary skill in the art are aware, although FIG. 2 and the disclosure illustrate performing NFV virtualization for a PE node, the disclosure is not limited to that application. For instance, the NFV virtualization may apply to other network devices, such as an IP router. Moreover, the PE Orchestrator 202 may be configured to manage NFs and/or a set of NFs that perform functions from one or more network devices. Additionally, although the disclosure references placing NFs within VMs (e.g. PE VMs 216), persons of ordinary skill in the art are also aware that other types of virtual containers besides VMs may be used to host NFs. The use and discussion of FIGS. 2 and 4-9 are only an example to facilitate ease of description and explanation.

Figure 3:
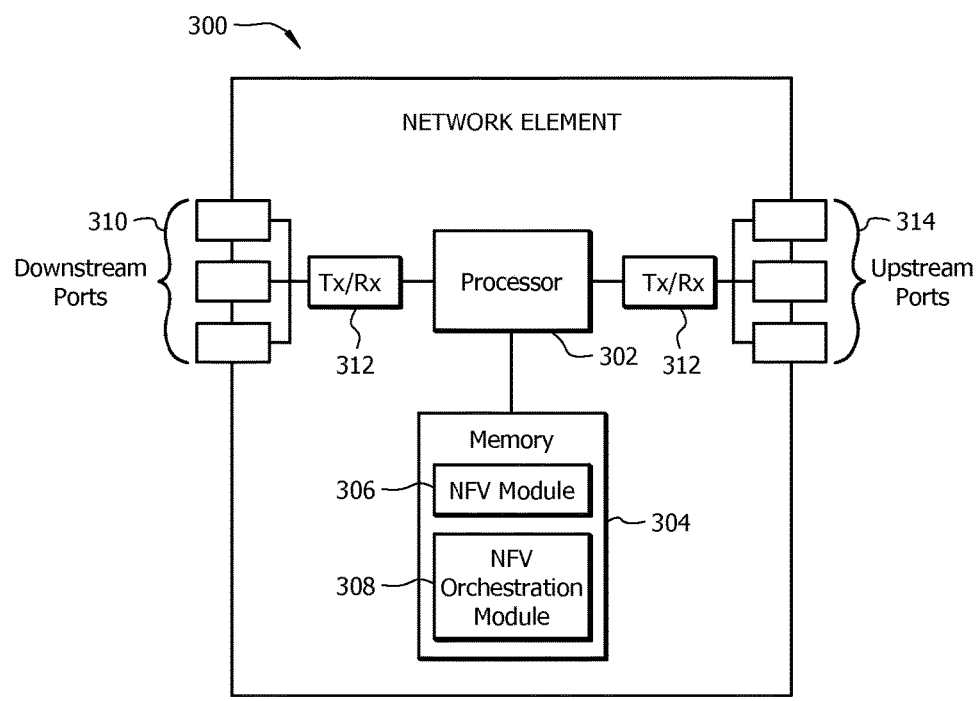
FIG. 3 is a schematic diagram of an embodiment of a network element.

At least some of the features/methods described in the disclosure may be implemented in a network element. For instance, the features/methods of the disclosure may be implemented using hardware, firmware, and/or software installed to run on hardware. The network element may be any device (e.g., a switch, router, bridge, server, client, etc.) that transports data through a network, system, and/or domain. FIG. 3 is a schematic diagram of an embodiment of a network element 300 that may be used to transport and/or process data through NFV systems 100 and 200 as shown in FIGS. 1 and 2. In one embodiment, the network element 300 may be any apparatus used to create, modify, relocate, and/or migrate one or more virtual containers (e.g. VMs). The network element 300 may also be any apparatus used to host, store, and/or execute one or more NFs. For example, network element 300 may be an NFV Management and Orchestration system 128 or one of is sub-components as described in FIG. 1. In another embodiment, network element 300 may be a PE VM 216 as described in FIG. 2.

The network element 300 may comprise one or more downstream ports 310 coupled to a transceiver (Tx/Rx) 312, which may be transmitters, receivers, or combinations thereof. The Tx/Rx 312 may transmit and/or receive frames from other network nodes via the downstream ports 310. Similarly, the network element 300 may comprise another Tx/Rx 312 coupled to a plurality of upstream ports 314, wherein the Tx/Rx 312 may transmit and/or receive frames from other nodes via the upstream ports 314. The downstream ports 310 and/or upstream ports 314 may include electrical and/or optical transmitting and/or receiving components.

A processor 302 may be coupled to the Tx/Rx 312 and may be configured to process the frames and/or determine which nodes to send (e.g. transmit) the frames. In one embodiment, the processor 302 may comprise one or more multi-core processors and/or memory modules 304, which may function as data stores, buffers, etc. The processor 302 may be implemented as a general processor or may be part of one or more application specific integrated circuits (ASICs) and/or digital signal processors (DSPs). Although illustrated as a single processor, the processor 302 is not so limited and may comprise multiple processors. The processor 302 may be configured to implement any of the schemes described herein, including the absolute decomposition method, network function decomposition method, service decomposition method, and/or method 1000.

FIG. 3 illustrates that the memory module 304 may be coupled to the processor 302 and may be a non-transitory medium configured to store various types of data. Memory module 304 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 304 may be used to house the instructions for carrying out the system and methods described herein, e.g., as a management entity 104, external entity 108, orchestration system 210, etc. In one embodiment, the memory module 304 may comprise an NFV module 306 that may be implemented on the processor 302. Alternately, the NFV module 306 may be implemented directly on the processor 302. The NFV module 306 may be configured to host, store, and execute one or more NFs for a virtualized network device. Hosting, storing, and executing one or more NFs will be discussed in FIGS. 4-9. In another embodiment, the memory module 304 may also comprise an NFV orchestration module 308 that may create, modify, relocate, and/or migrate one or more virtual containers. Additionally, the NFV orchestration module 308 may provide group information used to group together NFs, virtual containers, and/or other virtual network nodes. Creating, modifying, relocating, migrating, and grouping VMs and/or other virtual containers are discussed in more detail in FIGS. 2 and 4-10.

It is understood that by programming and/or loading executable instructions onto the network element 300, at least one of the processor 302, the cache, and the long-term storage are changed, transforming the network element 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
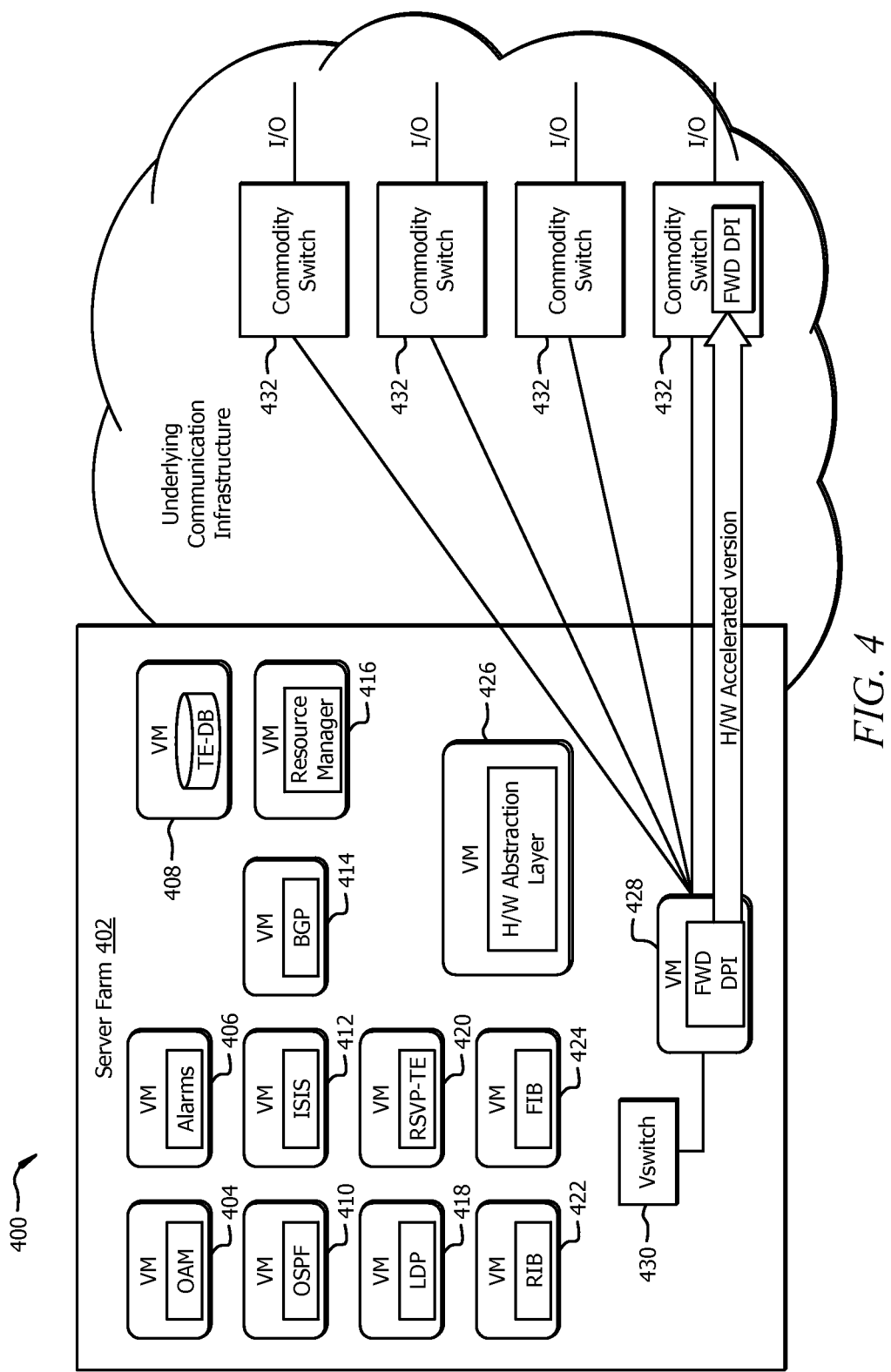
FIG. 4 is a schematic diagram of an embodiment of a virtualized PE node using an absolute decomposition method.

FIG. 4 is a schematic diagram of an embodiment of a virtualized PE node 400 using an absolute decomposition method. The absolute decomposition method fragments or divides PE network functions into separate NFs. For the absolute decomposition method, a PE Orchestrator may launch virtual containers to host each NF. The virtual containers may be hosted on one or more servers that implement computing and/or storage network functions within a server farm 402. Virtual containers, Vswitches 430 within a virtual network, and/or commodity switches 432 within the underlying communication infrastructure (e.g. network hardware) may be used to implement the PE's data plane. The commodity switches 432 may be configured with different network encapsulation capabilities (e.g. Multiprotocol Label Switching (MPLS) encapsulation). In one embodiment, the underlying communication infrastructure and server farm 402 may be a data center network and/or a portion of a service provider network. The commodity switches 432 may include Ethernet switches, high performance switches, and/or other physical network nodes used to transport data within and/or outside the data center or server provider network. The Vswitches 430 may be virtualized network nodes also used to transport data within and/or outside the data center network or service provider network.

The absolute decomposition method treats a virtualized PE node 400 as the sum of a set of interworking NFs and allocates a virtual container to each component. As shown in FIG. 4, the virtualized PE node 400 may comprise an OAM VM 404, an Alarms VM 406, a traffic engineering (TE) database (DB) VM 408, an Open Shortest Path First (OSPF) VM 410, an Intermediate System to Intermediate System (IS-IS) VM 412, a Border Gateway Protocol (BGP) VM 414, a resource manager VM 416, a Label Distribution Protocol (LDP) VM 418, a resource reservation protocol (RSVP)-TE VM 420, a routing information base (RIB) VM 422, a forwarding information base (FIB) VM 424, a hardware abstraction layer VM 426, a forwarding and DPI VM 428, and a Vswitch 430. OSPF VM 410, IS-IS VM 412, BGP VM 414, LDP VM 418, and RSVP-TE VM 420 may host NFs configured to perform OSPF, IS-IS, BGP, LDP, and RSVP-TE protocols, respectively. The OAM VM 404 may host an NF configured to perform OAM operations, and the Alarms VM 406 may host an NF configured to generate notifications or alarms originating from network errors or faults. The RIB VM 422 and FIB VM 424 may host NFs that comprise one or more tables used to route incoming data packets to the proper destination nodes. The hardware abstraction layer VM 426 may host an NF configured to store the mapping of the virtual resources (e.g. resources allocated to VMs) to hardware resources (e.g. server).

The resource manager VM 416 may host an NF configured to internally monitor the resources used for each of the VMs. Upon the initial launch and setup, each of the NFs hosted within a VM can be individually fine-tuned based on network dynamics and real time requirements. Recall that VM resource modification may be either proactive or reactive. For example, a network administrator or operator may observe a growth in the number of BGP peers in the network and can instruct the PE Orchestrator to allocate more CPU and/or memory resources to the BGP VM 414. Alternatively, each VM can be created based on a profile that indicates high water marks along with threshold limits for the VM's resources. The PE Orchestrator may monitor the VM resources by examining the notification events the PE Orchestrator receives from the Virtual Machine Manager and adjust the resources allocated to the virtual containers accordingly.

The virtualized PE node's 400 data plane may be implemented in virtual containers, Vswitches 430 on servers, and/or commodity switches 432 within the underlying communication infrastructure (e.g. network hardware 116 in FIG. 1). The underlying communication infrastructure may be used to implement inter-process communication messages in a closed system and may be responsible for connecting the virtual containers together. In FIG. 4, the forwarding and DPI VM 428 may be used to instruct commodity switches 432 within the underlying infrastructure on how to encapsulate, forward, and inspect data packets. The forwarding and DPI VM 428 may use Open Flow and/or some other application program interface (API) to communicate with the commodity switches 432. The forwarding and DPI VM 428 may also augment the commodity switches 432 with specialized accelerator modules in scenarios that demand a high performance data plane.

Virtualizing PE node 400 using the absolute decomposition method may provide a valuable scalability advantage over a non-virtualized PE device. A non-virtualized PE device may not only be limited in terms of the number of CPUs, network processing units (NPUs), and the size of the memory and storage, but the non-virtualized PE device may also be constrained with respect to the number of data path modules and ports (e.g. input and output (I/O) ports). Once a non-virtualized PE uses all available port capacity, a network administrator or operator may need to install a new PE device in the network. In contrast, using the absolute decomposition method to virtualize a PE node 400 may not impose a physical hard limit on data plane resources. A network administrator or operator may install more commodity switches 432 to satisfy growing data path demands of a virtualized PE node 400 in order to prevent additional OPEX costs associated with installing a new PE. In other words, the OPEX cost of expanding a virtualized PE node 400 may be equal to the cost of adding a new data path module within a network that uses a non-virtualized PE, which is a lower OPEX cost than configuring a new non-virtualized PE.

Figure 5:
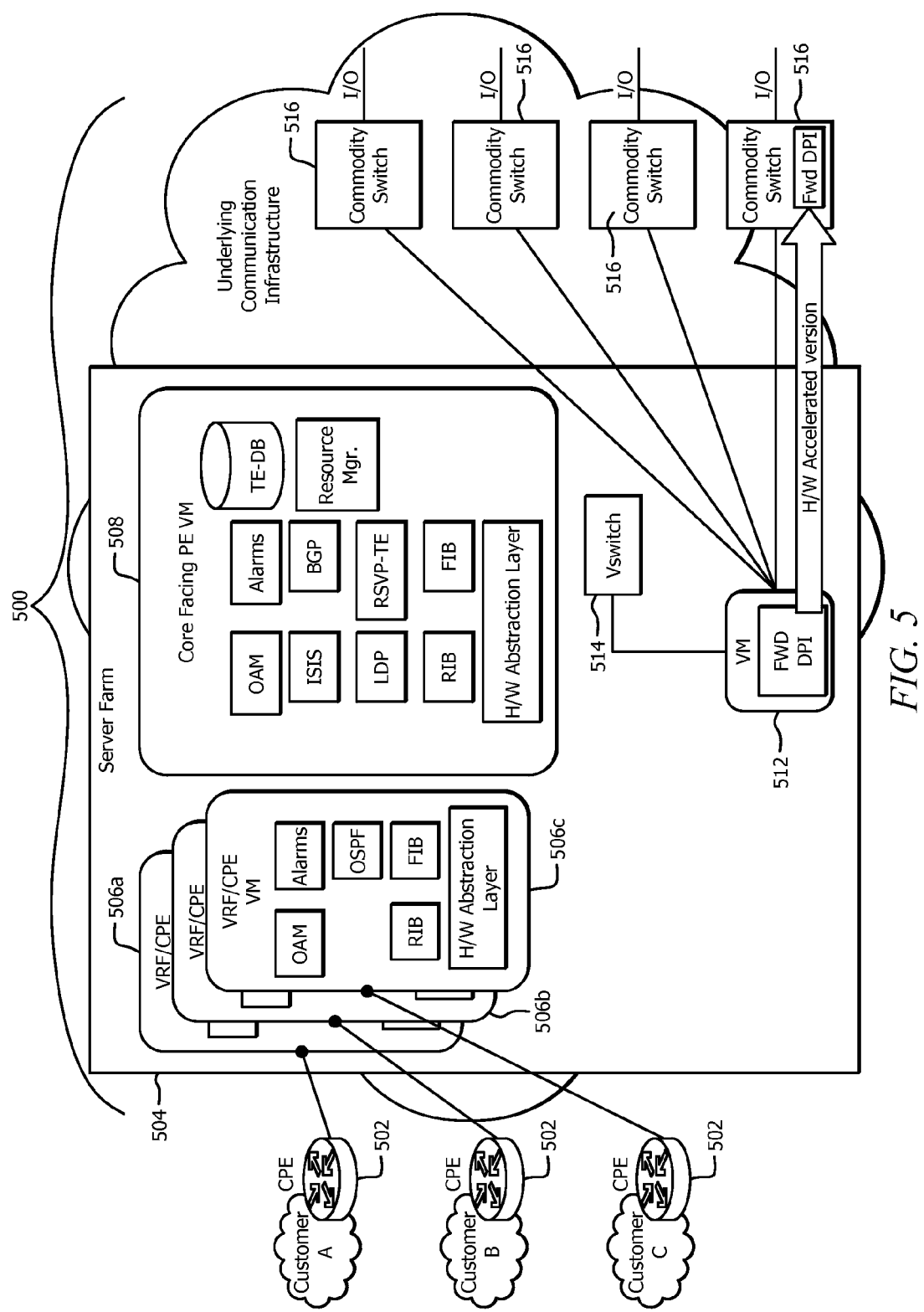
FIG. 5 is a schematic diagram of an embodiment of a virtualized PE node using a network function decomposition method.

FIG. 5 is a schematic diagram of an embodiment of a virtualized PE node 500 using a network function decomposition method. The network function decomposition method may virtualize a PE device by dividing the PE device into subcomponents based on network segment connectivity to form a virtualized PE node 500. Specifically, the network function decomposition method may split a PE device into a UNI subcomponent and an NNI subcomponent. The UNI subcomponent and the NNI subcomponent may be separated and implemented using separate VMs and/or other virtual containers. By splitting the PE device into the UNI subcomponent and NNI subcomponent, each subcomponent may be fine-tuned independently of each other. Moreover, splitting the PE device may provide network administrators and operators to offload network resources to the virtual environment. Example embodiments for implementing the UNI subcomponents and NNI subcomponent will be discussed in more detail in FIGS. 6-8.

The UNI subcomponent may be configured to connect to a customer network to the virtualized PE node 500 and provide functionalities that are traditionally part of the VPN Routing and Forwarding (VRF), VPLS, and/or VPWS access component of a PE device. VRF, VPLS, and VPWS functionalities are described in more detail in the Internet Engineering Task Force (IETF) Request for Comments (RFC) 4026, entitled "Provider Provisioned Virtual Private Network (VPN) Terminology," published March 2005, which is incorporated herein as if reproduced in its entirety. The UNI subcomponent may communicate with a CPE node 502 to connect to a customer network.

FIG. 5 illustrates that the UNI subcomponent may be hosted using VRF/CPE VMs 506a-c. VRF/CPE VMs 506a, 506b, 506c may be used to connect to customer A network, customer B network, and customer C network, respectively. Each of the VRF/CPE VMs 506a-c may comprise a plurality of NFs that correspond to PE network functions performed by a UNI subcomponent. As shown in FIG. 5, VRF/CPE VMs 506a, 506b, 506c may each comprise a plurality of NFs configured to implement the OAM, Alarms, OSPF, RIB, FIB, and hardware abstraction layer network functions that were described in FIG. 4 in order to connect to the customer networks. The CPE nodes 502 may be configured to perform typical CPE device network functions, such as routing, VPN termination, QoS support, DPI, firewall, and performing wide area network (WAN) Optimization Controller (WOC) functions.

The NNI subcomponent may be configured to manage internal network communications with the network that the virtualized PE node 500 is located in. For example, the NNI subcomponent may manage PE communications with a service provider's internal network and may be responsible for a variety of network functions, such as BGP peering, MPLS signaling, and VPN discovery. As shown in FIG. 5, the NNI subcomponent may be hosted within the Core Facing PE VM 508. The Core Facing PE VM 508 may be a VM comprising a plurality of NFs that are configured to perform a variety of PE network functions that include, but are not limited to OAM, alarm, IS-IS, BGP, LDP, RSVP-TE, RIB, FIB, TE-DB, resource managing, RIB, FIB, and hardware abstraction layer functions, which were described in FIG. 4. The server farm 504, Vswitch 514, forwarding and DPI VM 512, and commodity switches 516 are substantially similar to the server farm 402, Vswitch 430, forwarding and DPI VM 428, and commodity switches 432 as described in FIG. 4, respectively.

Figure 6:
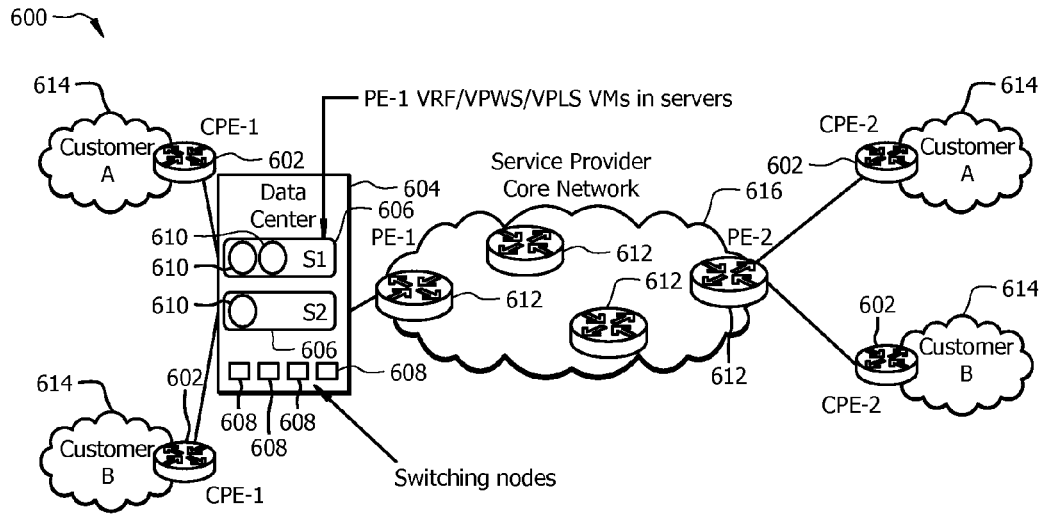
FIG. 6 is a schematic diagram of an embodiment of an NFV system that comprises a non-virtualized PE device operating along with a virtualized user-to-network interface (UNI) subcomponent using the network function decomposition method.

FIG. 6 is a schematic diagram of an embodiment of an NFV system 600 that comprises a non-virtualized PE device 612 operating along with a virtualized UNI subcomponent using the network function decomposition method. In this embodiment, the network function decomposition method may offload and move the UNI network functions (e.g. VRF/VPWS/VPLS functions) of a PE-1 device 612 to the virtual environment. The UNI functions are coupled to CPE-1 nodes 602 at the customer premises. The NNI function, remains in the non-virtualized PE-1 device 612, which is coupled to the service provider's core network 616. The data center 604 may comprise the NFV systems 100 and 200 as described in FIGS. 1 and 2 to provide the connectivity between the virtualized and non-virtualized sides of the PE-1 device 612. The data center 604 may be located within the service provider network or may be a network external to the service provider network.

As shown in FIG. 6, the non-virtualized PE-1 device 612 may implement the NNI functionality used to communicate with the service provider core network 616 and other non-virtualized PE devices 612. The servers 606 within the data center 604 may comprise PE-1 VRF/VPWS/VPLS VMs 610 used to implement the UNI network functions used to connect to customer A and B networks 614 via the CPE-1 nodes 602. Switching nodes 608 may be substantially similar to the commodity switches 432 as described in FIG. 4. As such, switching nodes 608 may be used to exchange data packets amongst the PE-1 VRF/VPWS/VPLS VMs 610, non-virtualized PE-1 devices 612, and/or the CPE-1 nodes 602.

When data packets arrive at the non-virtualized PE-1 device 612 from the service provider's core network 616, the data packets are initially processed by identifying their VRF component within the non-virtualized PE-1 device 612. Typically, the VRF component within the non-virtualized PE-1 device 612 is identified using one or more tags encapsulated within the data packet. However, because UNI network functions have been offloaded and virtualized, the data packets are forwarded to the corresponding PE-1 VRF/VPWS/VPLS VM 610 used to implement the VRF rather than forwarding the data packet to the VRF component within the non-virtualized PE-1 device 612. For outbound packets that are leaving a customer network 614, the CPE-1 nodes 602 send the packets to their corresponding PE-1 VRF/VPWS/VPLS VMs 610 to initially process the data packets. Afterwards, the PE-1 VRF/VPWS/VPLS VMs 610 forward the packets to the non-virtualized PE for transmission to other peer non-virtualized PE devices 612 across the service provider's core network 616.

The offloading of the UNI functions for a PE device to virtual containers may free resources for the non-virtualized PE-1 device 612 to be used for NNI functionalities. Also, by virtualizing the UNI functionality, a network administrator or operator can now expand the UNI side by instigating new PE-1 VRF/VPWS/VPLS VMs 610 and associating them with new customers and/or customer networks 614. The new PE-1 VRF/VPWS/VPLS VMs 610 may be hosted on the same servers (e.g. server S1 or S2 606) or on different servers 606. The PE-1 VRF/VPWS/VPLS VMs 610 may be independent of one another and may offer an inherent protection mechanism. Resources allocated to the PE-1 VRF/VPWS/VPLS VMs 610 can be individually fined-tuned to accommodate the customer's need, while the non-virtualized PE-1 device 612 remains intact.

Figure 7:
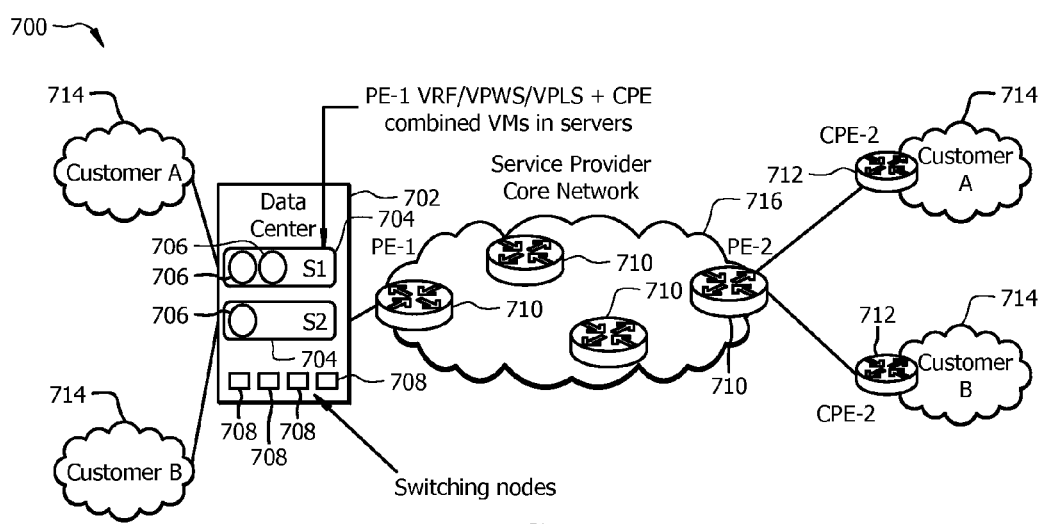
FIG. 7 is a schematic diagram of an embodiment of an NFV system that comprises a non-virtualized PE device operating along with a virtualized UNI subcomponent and a virtualized customer provider edge (CPE) component using the network function decomposition method.

FIG. 7 is a schematic diagram of an embodiment of an NFV system 700 that comprises a non-virtualized PE device 710 operating along with a virtualized UNI subcomponent and a virtualized CPE component using the network function decomposition method. Data center 702, servers 704, switching nodes 708, non-virtualized PE devices 710, CPE nodes 712, customer networks 714, and service provider core network 716 are substantially similar to the data center 604, servers 606, switching nodes 608, non-virtualized PE devices 612, CPE nodes 602, customer networks 614, and service provider core network 616 as described in FIG. 6, respectively. The PE-1 VRF/VPWS/VPLS+CPE VMs 706 are substantially similar to the PE-1 VRF/VPWS/VPLS VMs 610 except that the PE-1 VRF/VPWS/VPLS+CPE VMs 706 also host typical CPE network functions. The CPE network functions include, but are not limited to firewall, web security, WAN acceleration and optimization, and routing functions. The CPE network functions may correspond to a second set of NFs, where each of the NFs within the second set of NFs corresponds to a CPE network function. The NFs corresponding to the CPE network functions and NFs corresponding to the UNI functions may be grouped and hosted by the PE-1 VRF/VPWS/VPLS+CPE VMs 706. In another embodiment, the CPE network functions within the second set of NFs and the NFs corresponding to the UNI functions may be instigated onto separate VMs and may not be combined onto a single VM. A network administrator or operator may move CPE network functions to the virtualized environment to reduce CAPEX cost.

Figure 8:
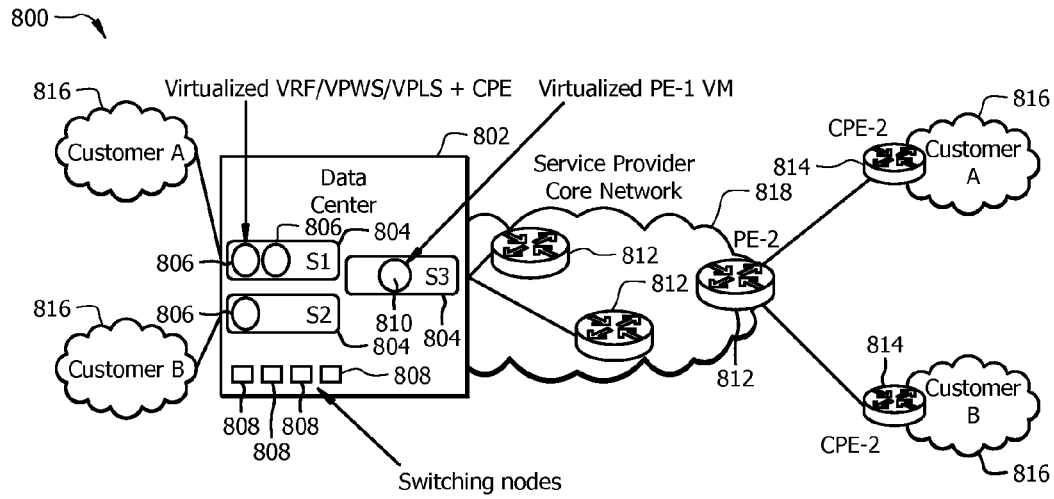
FIG. 8 is a schematic diagram of an embodiment of an NFV system that comprises a virtualized UNI subcomponent, a virtualized network-to-network interface (NNI) subcomponent, and a virtualized CPE component using the network function decomposition method.

FIG. 8 is a schematic diagram of an embodiment of an NFV system 800 that comprises a virtualized UNI subcomponent, a virtualized NNI subcomponent, and a virtualized CPE component using the network function decomposition method. Data center 802, servers 804, switching nodes 808, non-virtualized PE devices 812, CPE nodes 814, customer networks 816, and service provider core network 818 are substantially similar to the data center 604, servers 606, switching nodes 608, non-virtualized PE devices 612, CPE nodes 602, customer networks 614, and service provider core network 616 as described in FIG. 6, respectively. The VRF/VPWS/VPLS+CPE VMs 806 are substantially similar to the PE-1 VRF/VPWS/VPLS+CPE VMs 706 as described in FIG. 7. The data center 802 further comprises a virtualized PE-1 VM 810 configured to perform the NNI network functions. In other words, the PE-1 VM 810 performs substantially the same functions as the Core Facing PE-1 VM 508 as described in FIG. 5. A network administrator or operator may further reduce CAPEX and OPEX costs for a network by moving the UNI functions, NNI functions, and CPE functions in the virtual environment.

Figure 9:
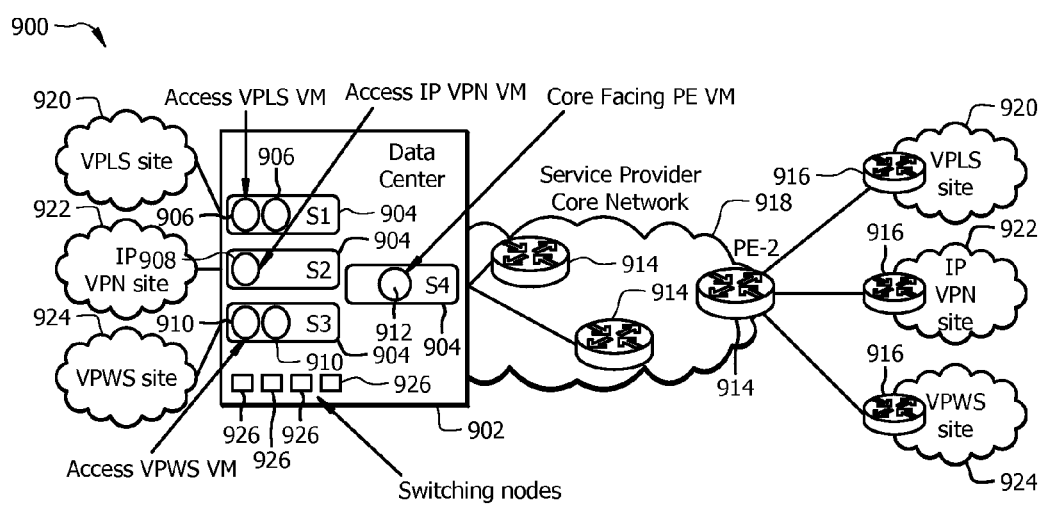
FIG. 9 is a schematic diagram of an embodiment of an NFV system that uses a service decomposition method to virtualize a PE node.

FIG. 9 is a schematic diagram of an embodiment of an NFV system 900 that uses a service decomposition method to virtualize a PE node. The service decomposition method divides a PE device into NFs that correspond to individual network services. In one embodiment, the network services may be provider provisioned virtual private network service functions, such as IP VPN, VPWS, and VPLS, as described in IETF RFC 4026. Each of the network services may be L2 and/or L3 services used to connect to different customer sites. For a service decomposition method, the PE Orchestrator may launch each of the network services on separate virtual containers. As such, the network services are independent of one another and can scale independently as per their requirements without infringing on each other's resources. As shown in FIG. 9, the VPLS site 920 communicates with the Access VPLS VM 906; the IP VPN site 922 communicates with the Access IP VPN VM 908; and the VPWS site 924 communicates with the Access VPWS VM 910. The VPLS site 920, IP VPN site 922, and VPWS site 924 may be customer networks configured to implement VPLS, IP VPN, and VPWS, respectively. The Access VPLS VM 906, Access IP VPN VM 908, and Access VPWS VM 910 may be configured to implement PE network functions using a plurality of NFs, such as OAM, Alarms, OSPF, RIB, FIB, and hardware abstraction layer functions.

The NNI may be treated as a shared resource that may be implemented in a single Core Facing PE VM 912 or divided into a plurality of Core Facing PE VMs 912. When multiple Core Facing PE VMs 912 are used, each of the Core Facing PE VMs 912 may be coupled to and correspond to one of the network service side VMs. For example, the Access VPLS VM 906 may be coupled to a first Core Facing PE VM 912, while the Access IP VPN VM 908 may be coupled to a second Core Facing PE VM 912. The Core Facing PE VM 912 may perform functions substantially similar to the Core Facing PE VM 508 as described in FIG. 5. Data center 902, servers 904, switching nodes 926, non-virtualized PE devices 914, CPE nodes 916 and service provider core network 918 are substantially similar to the data center 604, servers 606, switching nodes 608, non-virtualized PE devices 612, CPE nodes 602, and service provider core network 616 as described in FIG. 6, respectively.

Figure 10:
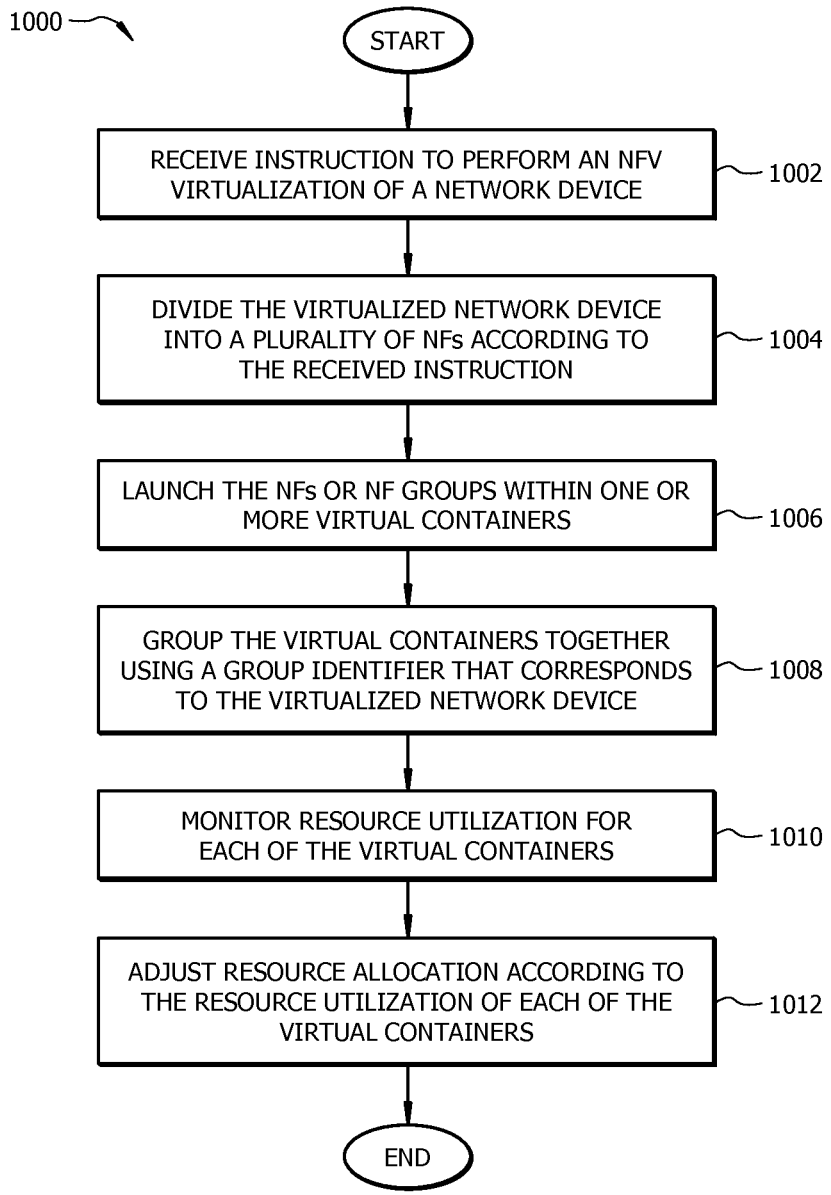
FIG. 10 is a flowchart of an embodiment of a method used to perform an NFV virtualization on a network device.

FIG. 10 is a flowchart of an embodiment of a method 1000 used to perform an NFV virtualization on a network device. Method 1000 may be implemented within a PE Orchestrator as described in FIG. 2 and a VNF Manager as described in FIG. 1. Method 1000 starts at block 1002 and receives an instruction to perform an NFV virtualization of a network device. The instruction may originate from a network administrator or operator. Method 1000 may directly receive the instructions from the network administrator or operator or may indirectly receive the instructions from the network administrator via a separate orchestrator, such as Orchestrator 102 in FIG. 1. Afterwards, method 1000 may then move to block 1004.

At block 1004, method 1000 may divide the virtualized network device into a plurality of NFs according to the received instructions. Method 1000 may divide the virtualized network device using the absolute decomposition method, network function decomposition method, and/or the service decomposition method. The received instructions originating from the network administrator or operator may determine which method is used to divide the virtualized network device. The NF may correspond to a network function performed by the virtualized network device. Recall that the absolute decomposition method divides the network device into separate device function components that correspond to separate NFs. For the network function decomposition method, the virtualized network device is divided based on network connectivity. For example, method 1000 may divide based on the interfaces (e.g. UNI and NNI) used to connect different networks. The service decomposition method divides the virtualized network device based on the network services, such as IP VPN, VPWS, and VPLS. Once method 1000 completes block 1004, method 1000 may then move to block 1006.

At block 1006, method 1006 may launch the NFs or NF groups within one or more virtual containers. For the absolute decomposition method, each of the NFs may be hosted within one of the virtual containers. Alternatively, method 1006 may launch one or more NFs in a single virtual container when implementing the network function decomposition method and/or the service decomposition method. Method 1000 may then continue to block 1008 to group the virtual containers together using a group identifier that corresponds to the virtualized network device. In one embodiment, the group identifier may be a device identifier used to identify the virtualized network device. Method 1000 may then proceed to block 1010.

At block 1010, method 1000 may monitor the resource utilization for each of the virtual containers. To obtain resource utilization for each of the virtual containers, method 1000 may communicate with other management entities and/or other virtualized network nodes. For example, method 1000 may obtain resource utilization information from the Virtualized Infrastructure Manager 106 and/or the Virtual Machine Manager 204 as described in FIGS. 1 and 2, respectively. Method 1000 may then move to block 1012 to adjust resource allocation according to the resource utilization of each of the virtual containers. Adjusting resource allocation may be implemented in a proactive manner or a reactive manner. In addition, at block 1012, method 1000 may migrate and/or move virtual containers to different servers and/or other hardware resource nodes when the current server and/or hardware resource node is unable to provide the resources needed by the virtual container.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus for performing network function virtualization (NFV), comprising:
a memory;
a processor coupled to the memory, wherein the memory includes instructions that when executed by the processor cause the apparatus to perform the following:
receive an instruction from a network administrator to virtualize a network device within a network according to one of a plurality of available decomposition methods selected by the network administrator, wherein the network device is a provider edge (PE) router configured to route data packets;
divide, according to the instruction, the network device into a plurality of network function units (NFs) used to form a virtualized network node that corresponds to the network device, wherein at least one of the NFs within the apparatus is used for routing the data packets;
launch the NFs within one or more virtual containers;
group the virtual containers together using a group identifier (ID) that corresponds to the virtualized network node;
install one or more commodity switches to provide the virtualized network node with additional port capacity; and
a transmitter coupled to the processor and configured to transmit the data packets to non-virtualized devices across a core network following processing of the data packets within the one or more virtual containers.

2. The apparatus of claim 1, wherein the group ID is a device ID assigned to the virtualized network node.

3. The apparatus of claim 1, wherein each of the NFs are hosted on different virtual containers.

4. The apparatus of claim 1, wherein at least some of the NFs are grouped together and placed within one of the virtual containers according to network connectivity.

5. The apparatus of claim 4, wherein the at least some of the NFs that are grouped together and placed within the one of the virtual containers corresponds to a user-to-network interface (UNI) used to connect to a customer network.

6. The apparatus of claim 5, wherein a second set of NFs are grouped within a second virtual container to implement a network-to-network (NNI) interface used to communicate with the network.

7. The apparatus of claim 5, wherein the one of the virtual containers further comprises one or more NFs that correspond to functions for a customer provider edge (CPE) node.

8. The apparatus of claim 1, wherein at least some of the NFs are grouped together and placed within one of the virtual containers according to a network service provided by the network device.

9. The apparatus of claim 8, wherein the network service provided by the network device is at least one of the following: an Internet Protocol (IP) virtual private network (VPN), a Virtual Private Wire Service (VPWS) and a Virtual Private Local Area Network (LAN) Service (VPLS).

10. The apparatus of claim 1, wherein the virtualized network node is configured to implement a portion of the network functions performed by the network device.

11. An apparatus for performing network function virtualization (NFV), comprising:

a memory;

a processor coupled to the memory, wherein the memory includes instructions that when executed by the processor cause the apparatus to perform the following:

receive an instruction from a network administrator identifying one of a plurality of available decomposition methods selected by the network administrator;

create, in response to the instruction received from the network administrator, a plurality of network function units (NFs) that correspond to a plurality of network functions performed by a non-virtualized network device within a network, wherein the non-virtualized network device is a provider edge (PE) router configured to route data packets and at least one of the NFs within the apparatus is used for routing the data packets;

load the NFs within one or more virtual containers;

group the virtual containers together using a group identifier (ID) that identifies the network functions performed by the non-virtualized network device;

monitor resource utilization for each of the virtual containers;

adjust resource allocation according to the resource utilization of each of the virtual containers;

install one or more commodity switches to provide additional data path ports; and a transmitter coupled to the processor and configured to transmit the data packets to non-virtualized devices across a core network following processing of the data packets within the one or more virtual containers.

12. The apparatus of claim 11, wherein a portion of the network functions performed by the non-virtualized network device are offloaded to the virtual containers.

13. The apparatus of claim 11, wherein the virtual containers are located on a plurality of hardware resource nodes, and wherein the instructions executed by the processor further cause the apparatus to trigger a move for one of the virtual containers from one of the hardware resource nodes to another hardware resource node.

14. The apparatus of claim 11, wherein the group ID is used to provide internal communication amongst the virtual containers.

15. The apparatus of claim 11, wherein the instructions executed by the processor further cause the apparatus to map the group ID to a network ID provided by the network.

16. A method for performing network function virtualization (NFV), comprising:

receiving an instruction from a network administrator to virtualize a provider edge (PE) device configured to route data packets and participating within a network, wherein the instruction identifies one of a plurality of available decomposition methods selected by the network administrator;

splitting the PE device into a plurality of network function units (NFs), wherein each of the NFs are used to perform a PE network function, wherein at least one of the NFs within the PE device is used for routing the data packets;

grouping the NFs based on the instruction into one or more NF groups;

placing each of the NF groups into a virtual container;

installing one or more switches to provide additional input and output (I/O) ports for transmission of the data packets; and forwarding, using a transmitter, a plurality of the data packets to non-virtualized devices across a core network following processing of the data packets within the virtual containers.

17. The method of claim 16, wherein one of the NF groups is used to provide provider provisioned virtual private network service functions.

18. The method of claim 17, wherein the virtual container hosting one of the NF groups also provides customer provider edge (CPE) network functions.

19. The method of claim 17, wherein the PE device is partially virtualized such that the one of the NF groups forwards the data packets to a non-virtualized PE device within the network to implement PE core side network functions, and wherein the PE core side network functions are used to facilitate communication within the network.

20. The method of claim 16, wherein one of the NF groups is used to provide PE core side network functions that are used to facilitate communication within the network.

* * * * *